US010630795B2

United States Patent
Aoki et al.

(10) Patent No.: US 10,630,795 B2
(45) Date of Patent: Apr. 21, 2020

(54) SYSTEMS AND METHODS FOR TRANSFERRING APPLICATION STATE BETWEEN DEVICES BASED ON GESTURAL INPUT

(75) Inventors: Norihiro Edwin Aoki, Sunnyvale, CA (US); Christina Wick, Vienna, VA (US); Todd Brannam, Burke, VA (US); Leotis Givens, Jr., Sammamish, WA (US)

(73) Assignee: Oath Inc., Dulles, VA (US)

( * ) Notice: Subject to any disclaimer, the term of this patent is extended or adjusted under 35 U.S.C. 154(b) by 91 days.

(21) Appl. No.: 13/436,171

(22) Filed: Mar. 30, 2012

(65) Prior Publication Data

US 2013/0080525 A1    Mar. 28, 2013

Related U.S. Application Data

(60) Provisional application No. 61/470,310, filed on Mar. 31, 2011.

(51) Int. Cl.
*H04L 29/08* (2006.01)
*G06F 9/48* (2006.01)

(52) U.S. Cl.
CPC ............ *H04L 67/26* (2013.01); *G06F 9/4856* (2013.01)

(58) Field of Classification Search
CPC ..... H04L 67/1095; H04L 67/26; H04L 67/34; H04L 67/24; H04L 67/148
USPC .......................................................... 709/204
See application file for complete search history.

(56) References Cited

U.S. PATENT DOCUMENTS

| 6,477,565 B1 | 11/2002 | Daswani et al. |
| 7,080,159 B2 | 7/2006 | Chu et al. |
| 7,188,183 B1 | 3/2007 | Paul et al. |
| 7,191,233 B2 | 3/2007 | Miller |
| 7,228,414 B2 | 6/2007 | Smith et al. |
| 7,444,423 B2 | 10/2008 | Shahi et al. |
| 7,487,248 B2 | 2/2009 | Moran et al. |
| 7,526,559 B1 | 4/2009 | Phillips |
| 7,529,767 B2 | 5/2009 | DeAnna et al. |

(Continued)

FOREIGN PATENT DOCUMENTS

| CN | 101489197 | 7/2009 |
| WO | WO2005/109829 | 11/2005 |

OTHER PUBLICATIONS

Pen Computing (Wikipedia, Jan. 8, 2011).*

(Continued)

*Primary Examiner* — Nicholas P Celani
(74) *Attorney, Agent, or Firm* — Bookoff McAndrews, PLLC

(57) ABSTRACT

Systems and methods are provided for transferring state between devices. In one implementation, a gestural input is detected, and a state of a source application is transferred from a first device to a second device in response to the gestural input. The second device may then generate an instance of a target application that corresponds to a representation of the state of the source application received from the first device. In an additional implementation, a state of the target application is transferred from the second device to the first device. The first device then updates a state of the source application to correspond to a representation of the state of the target application received from the second device.

25 Claims, 6 Drawing Sheets

(56) References Cited

U.S. PATENT DOCUMENTS

| | | | |
|---|---|---|---|
| 7,532,196 | B2 | 5/2009 | Hinckley |
| 7,853,988 | B2* | 12/2010 | Johnson ............ G06F 17/30902 380/258 |
| 7,865,931 | B1* | 1/2011 | Stone et al. ....................... 726/1 |
| 2002/0087476 | A1* | 7/2002 | Salas et al. ...................... 705/59 |
| 2002/0133526 | A1* | 9/2002 | Cronk et al. ................... 709/100 |
| 2003/0154398 | A1 | 8/2003 | Eaton et al. |
| 2003/0195963 | A1 | 10/2003 | Song et al. |
| 2005/0034124 | A1* | 2/2005 | House ................... G06F 9/4825 718/100 |
| 2005/0066037 | A1 | 3/2005 | Song et al. |
| 2005/0144284 | A1* | 6/2005 | Ludwig et al. ............... 709/226 |
| 2005/0198320 | A1 | 9/2005 | Chou et al. |
| 2006/0008245 | A1* | 1/2006 | Kim ................................ 386/46 |
| 2007/0146347 | A1 | 6/2007 | Rosenberg |
| 2008/0052165 | A1* | 2/2008 | Jung et al. ....................... 705/14 |
| 2008/0104520 | A1* | 5/2008 | Swenson et al. ............. 715/738 |
| 2008/0113618 | A1* | 5/2008 | De Leon et al. ............ 455/41.2 |
| 2008/0195735 | A1 | 8/2008 | Hodges et al. |
| 2008/0259042 | A1 | 10/2008 | Thorn |
| 2009/0063690 | A1 | 3/2009 | Verthein et al. |
| 2009/0207263 | A1* | 8/2009 | Mizuno et al. ............. 348/220.1 |
| 2009/0248754 | A1* | 10/2009 | Lipton .................... G06F 9/485 |
| 2009/0265470 | A1 | 10/2009 | Shen et al. |
| 2009/0282101 | A1* | 11/2009 | Lim ...................... G06F 9/5077 709/203 |
| 2009/0292838 | A1* | 11/2009 | Wong .............................. 710/52 |
| 2010/0013762 | A1 | 1/2010 | Zontrop et al. |
| 2010/0042733 | A1 | 2/2010 | Jeffrey |
| 2010/0217760 | A1* | 8/2010 | Melcher ............ G06F 17/30873 707/722 |
| 2010/0223498 | A1* | 9/2010 | Schlesinger et al. ........... 714/15 |
| 2010/0306764 | A1* | 12/2010 | Khanna ............... G06F 11/1482 718/1 |
| 2011/0065384 | A1* | 3/2011 | Cader et al. ................. 455/41.1 |
| 2013/0332846 | A1* | 12/2013 | Freedman ............. H01B 7/292 715/745 |
| 2017/0085631 | A1* | 3/2017 | Aoyagi ................... G06F 13/00 |

OTHER PUBLICATIONS

Gesture Recognition (Wikipedia, Jan. 8, 2011).*
Multi-Touch (Wikipedia, Jun. 7, 2017).*
RFC 1738 (T. Berners-Lee) Dec. 1994.*
An International Search Report and Written Opinion in International Patent Application No. PCT/US2012/031442, dated Jul. 5, 2012 (8 pages).
Yatani et al., "Toss-It: Intuitive Information Transfer Techniques for Mobile Devices", Apr. 27, 2005, pp. 1881-1884.
Dachselt et al., "Throw and Tilt-Seamless Interaction across Devices Using Mobile Phone Gestures" (7 pages).
Dachselt et al, "Natural Throw and Tilt Interaction between Mobile Phones and Distant Displays", Apr. 4-9, 2009, pp. 3253-3258.
Scheible et al., MobiToss: A Novel gesture based interface for creating and sharing mobile multimedia art on large public displays, Oct. 26-31, 2008, pp. 957-960.
Pering et al., "Gesture Connect: Facilitating Tangible Interaction With a Flick of the Wrist" (4 pages).

* cited by examiner

SYSTEMS AND METHODS FOR TRANSFERRING APPLICATION STATE BETWEEN DEVICES BASED ON GESTURAL INPUT

CROSS-REFERENCE TO RELATED APPLICATIONS

This application claims the benefit of priority to U.S. Provisional Patent Application No. 61/470,310, filed Mar. 31, 2011, the disclosure of which is incorporated herein by reference in its entirety.

BACKGROUND

Technical Field

The present disclosure generally relates to techniques for transferring a state of an application between devices. In particular, and without limitation, the present disclosure relates to systems and methods for transferring a state of an application between networked devices in response to gestural input.

Background Information

Today, increasingly sophisticated processing, media, and communications functionalities are incorporated into mobile devices, such as mobile telephones, smart phones, personal digital assistants (PDAs), and tablet computers. The increasing sophistication and capabilities of these mobile devices blur the boundaries that once separated mobile devices from sophisticated personal computing devices, and many users rely solely on such mobile devices to meet their computing needs.

However, these sophisticated mobile devices do not represent a standalone experience for many users. Instead, these mobile devices represent an essential element of an integrated computing experience through which a user may leverage conventional desktop and laptop personal computers with mobile devices to meet his or her computing needs.

The integration of these various devices into a seamless computing experience often presents practical challenges, especially when a user attempts to transition an application executing on a mobile device to a desktop computer, or alternatively, to transition an application executing on a desktop computer to a mobile device. For example, the user may initiate an instant messaging conversation on a mobile device, and may wish to continue the conversation on a computer when the user returns to the office. Further, a user may begin watching a movie on a desktop computer, and may wish to continue the viewing experience on a mobile device during his or her commute.

Transferring a session of an application from a mobile device to a desktop computer often requires the user to manually initiate an application session on the desktop computer to match the corresponding application session on the mobile device. For example, for an instant messaging application, the user may need to initiate the instant messaging client on the desktop computer, login into the instant messaging client on the desktop computer, and subsequently log out of the corresponding instant messaging client on the mobile device to ensure that pending conversations continue. In addition to inconveniencing the user and generating a perceptible discontinuity between the user's desktop and mobile devices, these transfer processes often result in a loss of essential session information, such as a conversation history associated with an instant messaging session.

In view of the foregoing, there is a need for improved systems and methods for automatically and seamlessly transferring a state of an application between user devices in near-real time, where the transfer of state is achieved with minimal input and/or inconvenience to the user.

SUMMARY

Consistent with embodiments of the present disclosure, a computer-implemented method detects a triggering event using a sensor associated with a first device. The method generates, using a processor, a representation of a state of a source application executed by the first device, in response to the detection of the triggering event. The method transmits the representation of the state of the source application to a second device, the second device being in communication with the first device.

Consistent with further embodiments of the present disclosure, an apparatus includes a storage device and at least one processor coupled to the storage device. The storage device stores a set of instructions that are executable by the at least one processor to configure the at least one processor to detect a triggering event using a sensor associated with a first device. The at least one processor is further configured by the set of instructions to generate a representation of a state of a source application, in response to the detection of the triggering event, and transmit the representation to a second device. The second device is in communication with the first device.

Consistent with still further embodiments of the present disclosure, a tangible, non-transitory computer-readable medium stores a set of instructions that, when executed by at least one processor, causes the at least one processor to detect a triggering event using a sensor associated with a first device. A representation of a state of a source application is generated in response to the detection of the triggering event, and the representation is transmitted to a second device in communication with the first device.

Consistent with yet another embodiment of the present disclosure, a computer-implemented method receives a request to transfer a state of a source application from a first device. The request is responsive to a triggering event detected by a sensor associated with the first device, and the request comprises at least a representation of the state of the source application. The method then determines, using the processor, that the received request is valid. Thereafter, the method modifies, in response to the determination that the received request is valid, a state of a target application associated with the representation, and transmits, in response to the modification, a confirmation of a successful transfer of the state of the source application.

It is to be understood that both the foregoing general description and the following detailed description are exemplary and explanatory only, and are not restrictive of the present disclosure or claims. Further, the accompanying drawings, which are incorporated in and constitute a part of this specification, illustrate embodiments of the present disclosure and together with the description, serve to explain principles of the present disclosure.

DETAILED DESCRIPTION

Reference will now be made in detail to embodiments of the invention, examples of which are illustrated in the accompanying drawings. The same reference numbers will be used throughout the drawings to refer to the same or like parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the subject matter described.

Figure 1:
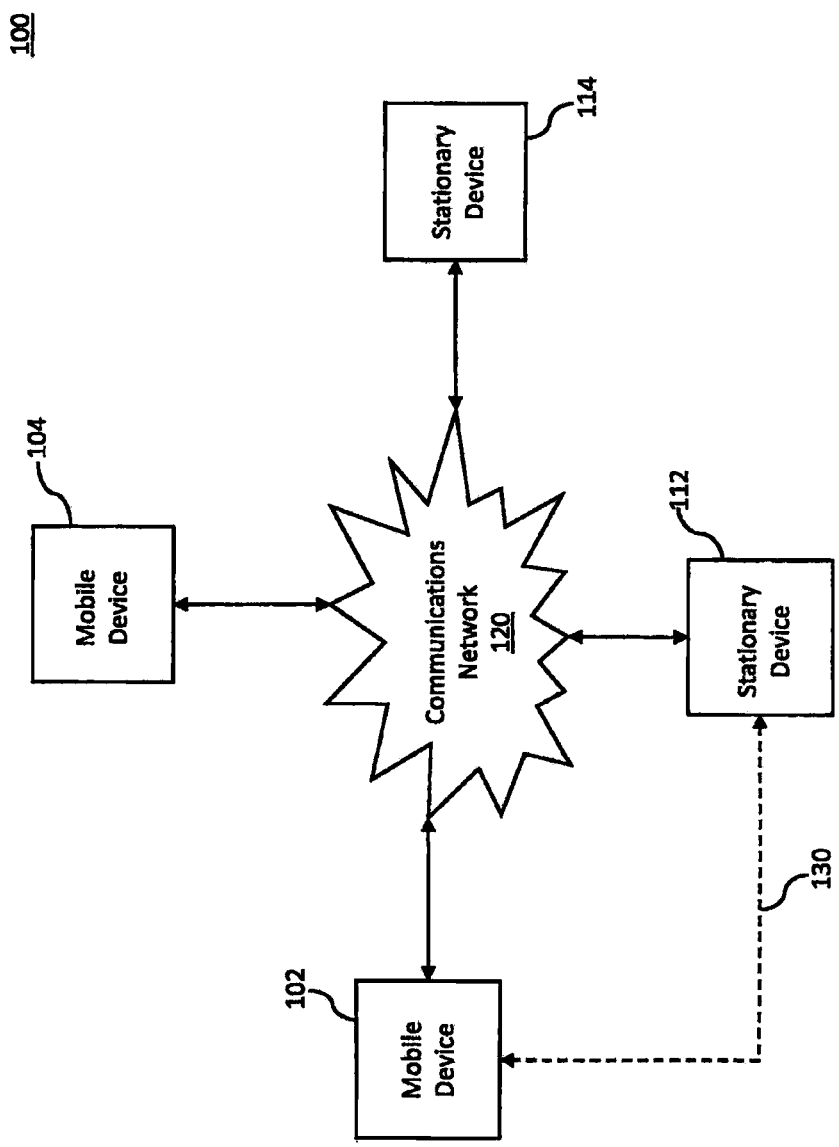
FIG. 1 is a diagram of an exemplary computing environment within which embodiments of the present disclosure may be practiced.

FIG. 1 illustrates an exemplary computing environment 100 within which embodiments of the present disclosure may be practiced. In FIG. 1, a plurality of devices, including devices 102, 104, 112, and 114, are interconnected via a communications network 120. Although the exemplary embodiment of FIG. 1 includes devices 102, 104, 112, and 114 in communication across network 120, persons of ordinary skill in the art will recognize that computing environment 100 may include any number of additional devices without departing from the spirit or scope of the present disclosure.

In an embodiment, devices 102 and 104 may be represent mobile devices configured to be moved throughout exemplary environment 100. For example, mobile devices 102 and 104 may include, but are not limited to, mobile telephones, smart phones, personal digital assistants having wireless communication capability, video game controllers, tablet personal computers (PCs), notebook computers, laptop computers, or any additional or alternate mobile device operable to transmit and receive data across network 120.

Further, in an embodiment, devices 112 and 114 may represent stationary devices that are generally immobile within computing environment 100. For example, stationary devices 112 and 114 may include, but are not limited to, voice-over-Internet-Protocol (VOIP) telephones, desktop PCs, display devices (e.g., flat screen televisions, LCD televisions, plasma televisions, projection-screen televisions, or projection systems), printers or facsimile machines, cable set-top boxes, digital video recorders (DVRs), web-enabled media players (e.g., DVD players), vehicular, home, or personal sound systems, or any additional or alternate devices operable to transmit and receive data across network 120. Additionally, stationary devices 112 and 114 may include devices similar to those discussed above in reference to mobile devices 102 and 114.

Communications network 120 may represent any form or medium for digital data communication. Further, communications network 120 may comprise a single network or any combination of networks. Examples of communication network 120 include a local area network ("LAN"), a wireless LAN (e.g., a "WiFi" network, a "Bluetooth" network, or a "Wireless USB" network), a wireless Metropolitan Area Network (MAN) that connects multiple wireless LANs, or a wide area network ("WAN"), e.g., the Internet. In the embodiments described herein, the Internet may include any publicly-accessible network or networks interconnected via one or more communication protocols, including, but not limited to, hypertext transfer protocol (HTTP) and transmission control protocol/internet protocol (TCP/IP). Moreover, communications network 120 may also include one or more mobile device networks, such as a GSM network or a PCS network, that allow mobile devices to send and receive data via applicable communications protocols, including those described above.

In an embodiment, network 120 may represent a wireless LAN that facilitates communications between the mobile and stationary devices of FIG. 1. For example, using a Bluetooth communications protocol, a first Bluetooth-enabled device (e.g., mobile device 102 of FIG. 1) may be paired with a second Bluetooth enabled device (e.g., stationary device 112 of FIG. 1) across network 120. Upon pairing, a peer-to-peer communications session may be established between mobile device 102 and stationary device 112 whenever mobile device 102 is placed within range of stationary device 112 (i.e., whenever mobile device 102 is disposed in close proximity to stationary device 112).

However, although described in terms of Bluetooth connections, wireless LANs associated with network 120 are not limited to such exemplary wireless protocols. In additional embodiments, communications network 120 may facilitate peer-to-peer or other communication between the mobile and stationary devices of computing environment 100 using any additional or alternate wireless communications protocols apparent to one of skill in the art and appropriate to mobile devices 102 and 104, to stationary devices 112 and 114, and to network 120. For example, such communication may be facilitated using WiFi protocols, Wireless USB protocols, or near-field communication protocols without departing from the spirit or scope of the disclosed embodiments.

Furthermore, peer-to-peer communications between the mobile and stationary devices of computing environment 100 need not be facilitated by network 120. In additional embodiments, peer-to-peer communications sessions may be established directly between the mobile and stationary devices of computing environment 100 using one or more of the communications protocols outlined above. For example, and referring to FIG. 1, mobile device 102 may establish a direct peer-to-peer connection 130 with stationary device 112 using a Bluetooth communications protocol, a near-field communications protocol, a Wi-Fi protocol, a Wireless USB protocol, or any additional or alternate communications protocol apparent to one of skill in the art.

Figure 2:
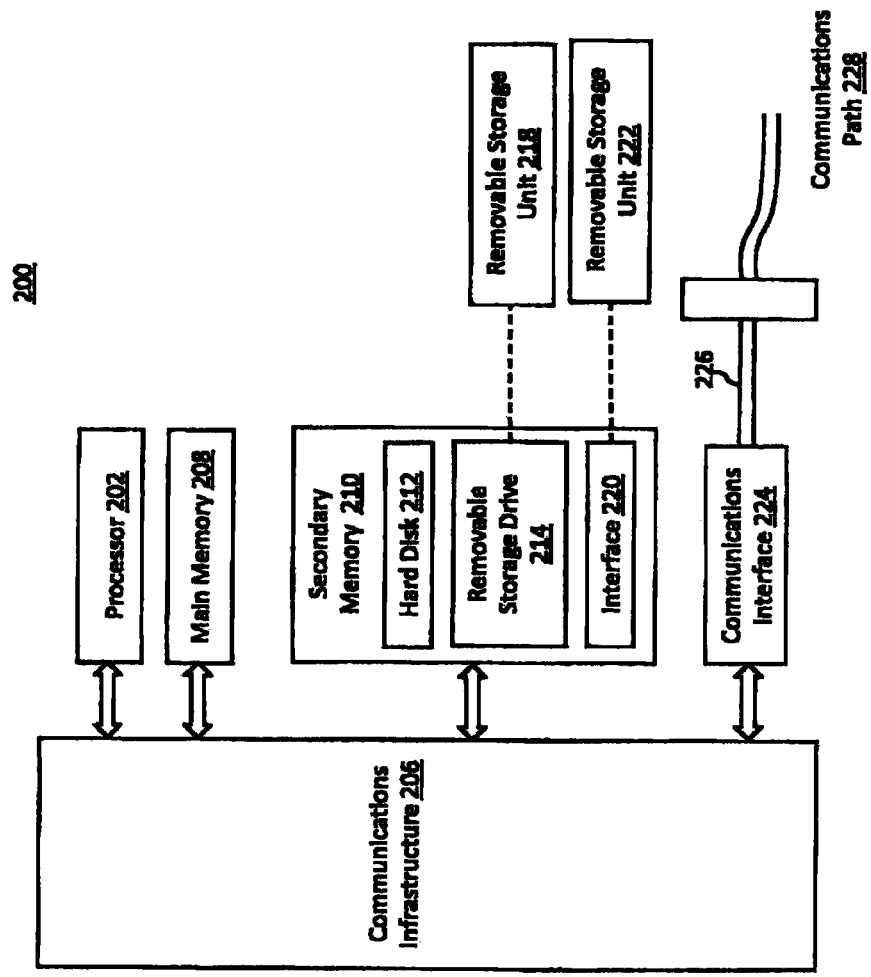
FIG. 2 is a diagram of an exemplary computer system, consistent with embodiments of the present disclosure.

In FIG. 1, mobile devices 102 and 104 and stationary devices 112 and 114 may represent any type of computer system capable of performing communication protocol processing. FIG. 2 is an exemplary computer system 200, according to an embodiment of the present disclosure. Computer system 200 includes one or more processors, such as processor 202. Processor 202 is connected to a communication infrastructure 206, such as a bus or network, e.g., network 120 of FIG. 1.

Computer system 200 also includes a main memory 208, for example, random access memory (RAM), and may include a secondary memory 210. Secondary memory 210 may include, for example, a hard disk drive 212 and/or a removable storage drive 214, representing a magnetic tape drive, an optical disk drive, CD/DVD drive, etc. The removable storage drive 214 reads from and/or writes to a removable storage unit 218 in a well-known manner. Removable storage unit 218 represents a magnetic tape, optical disk, or other computer-readable storage medium that is read by and written to by removable storage drive 214. As will be appreciated, the removable storage unit 218 can represent a computer-readable medium having stored therein computer programs, sets of instructions, code, or data to be executed by processor 202.

In alternate embodiments, secondary memory 210 may include other means for allowing computer programs or other program instructions to be loaded into computer system 200. Such means may include, for example, a removable storage unit 222 and an interface 220. An example of such means may include a removable memory chip (e.g., EPROM, RAM, ROM, DRAM, EEPROM, flash memory devices, or other volatile or non-volatile memory devices) and associated socket, or other removable storage units 222 and interfaces 220, which allow instructions and data to be transferred from the removable storage unit 222 to computer system 200.

In an embodiment, main memory 208, and additionally or alternatively, secondary memory 210, may store operating systems, such as DOS, Windows, or Linux, and may also include one or more application programs, such as word processing programs, database programs, spreadsheet programs, presentation programs, and graphics programs, media players, computerized video games, social networking and micro-blogging applications, instant messaging applications, and/or other programs capable of generating documents or other electronic content. Furthermore, memories 206 and 216 may include browser applications capable of rendering standard Internet content, such as Netscape Navigator, Microsoft Internet Explorer, and/or Mozilla Firefox. Application programs may be implemented using applets, plug-ins, modules, widgets, and/or any other software components.

Computer system 200 may also include one or more communications interfaces, such as communications interface 224. Communications interface 224 allows software and data to be transferred between computer system 200 and external devices. Examples of communications interface 224 include, alone or in any combination, a modem, a network interface (e.g., an Ethernet card), a communications port, a PCMCIA slot and card, a wireless transmitter or card, etc. Software and data may be transferred via communications interface 224 in the form of signals 226, which may be electronic, electromagnetic, optical or other signals capable of being received by communications interface 224. These signals 226 are provided to communications interface 224 via a communications path (i.e., channel 228). Channel 228 carries signals 226 and may be implemented using wire or cable, fiber optics, an RF link, wireless transmissions, and other communications channels. In an embodiment of the present disclosure, signals 226 comprise data packets sent to processor 202. Information representing processed packets can also be sent in the form of signals 226 from processor 202 through communications path 228.

The terms "storage device" and "storage medium" may refer to particular devices including, but not limited to, main memory 208, secondary memory 210, a hard disk installed in hard disk drive 212, and removable storage units 218 and 222. Further, the term "computer-readable medium" may refer to devices including, but not limited to, a hard disk installed in hard disk drive 212, any combination of main memory 208 and secondary memory 210, and removable storage units 218 and 222, which respectively provide computer programs and/or sets of instructions to processor 202 of computer system 200. Such computer programs and sets of instructions can be stored within one or more computer readable media. Additionally or alternatively, computer programs and sets of instructions may also be received via communications interface 224 and stored on the one or more computer readable media.

Such computer programs and instructions, when executed by processor 202, enable processor 202 to perform one or more of the computer-implemented methods described herein. Examples of program instructions include, for example, machine code, such as that code produced by a compiler, and files containing a high-level code that can be executed by processor 202 using an interpreter.

The computer-implemented methods described herein can be implemented on a single processor of a computer system, such as processor 202 of system 200. In another embodiment, computer-implemented methods consistent with embodiments of the present disclosure may be implemented using one or more processors within a single computer system, and additionally or alternatively, these computer-implemented methods may be implemented on one or more processors within separate computer systems linked via a network.

Figure 3:
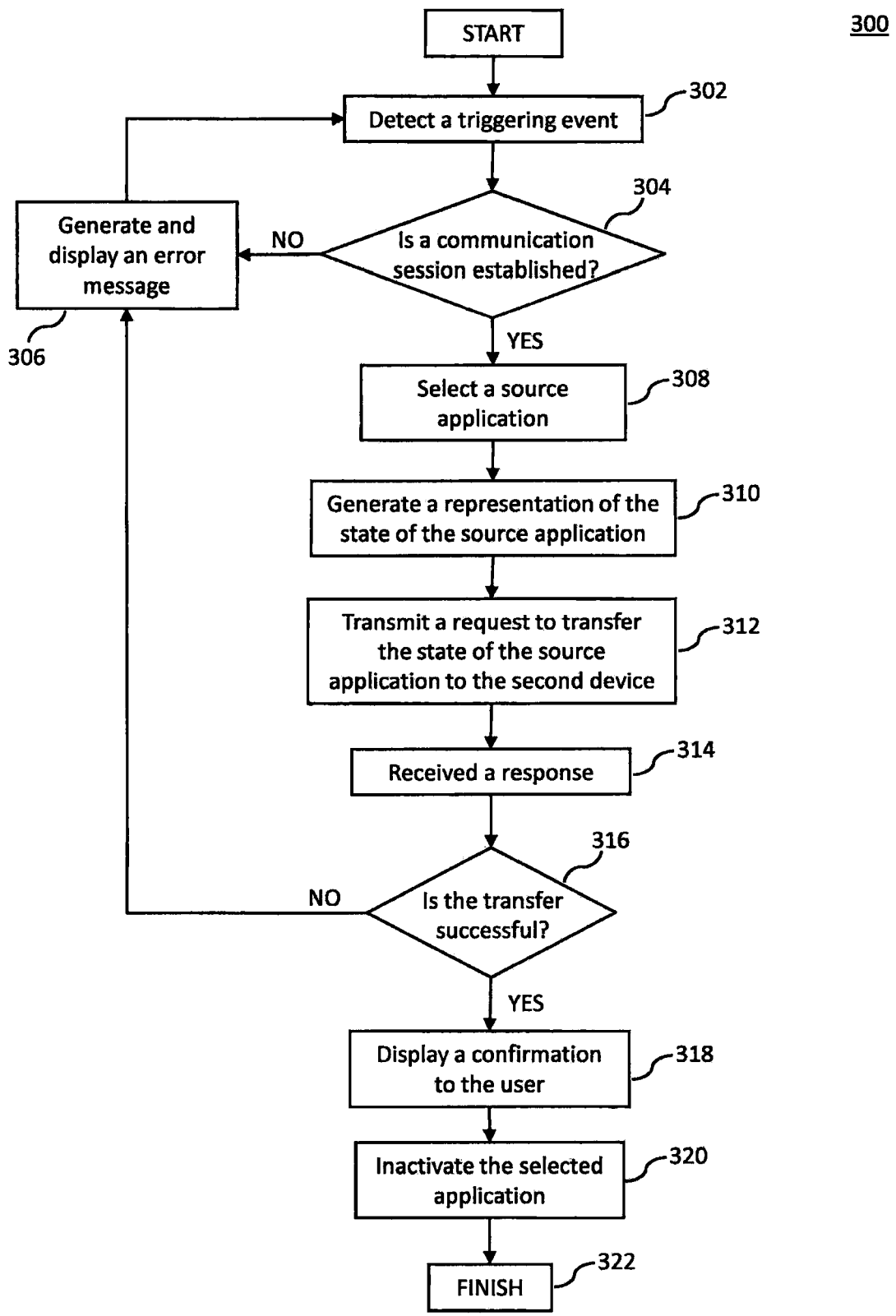
FIGS. 3 and 4 are flowcharts of exemplary methods for transferring a state of an application between devices, according to an embodiment of the present disclosure.

FIG. 3 is a flow diagram of an exemplary method 300 for transferring a state of an application between devices across network 120 in near-real time, according to an embodiment of the present disclosure. The exemplary method of FIG. 3 may enable a user of a first device (e.g., mobile device 102) to perform an action that transfers a state of an application to a second device (e.g., stationary device 112) across network 120. Upon a successful transfer of the state of an application, a seamless extension of the user's interaction with the application may be provided between the two devices.

For purposes of illustration, the exemplary method of FIG. 3 will now be described with reference to transferring a state of an application from mobile device 102 to stationary device 112. It will be appreciated, however, that the exemplary method may be implemented to transfer state of an application between any other combination of devices, such as from a first mobile device (e.g., a smart phone) to a second mobile device (e.g., another smart phone, a PDA, or computerized tablet).

In step 302, mobile device 102 may detect a triggering event that initiates a transfer of a state of an application from mobile device 102 to stationary device 112. For example, the triggering event may represent a physical motion that includes, but is not limited to, a shaking of mobile device 102 by the user, a gentle tapping of mobile device 102 by the user against a solid object, or any additional or alternate user action appropriate and natural to the transfer of the state of the application. In one embodiment, the triggering event may comprise a physical motion by the user that results in a rapid acceleration and deceleration of mobile device 102.

To detect a triggering event, mobile device 102 may incorporate a sensor (e.g., an accelerometer or other motion detector) that detects the motion of mobile device 102 and may generate a corresponding output indicative of, for example, a magnitude of an acceleration experienced by mobile device 102. Based on the output of the sensor, mobile device 102 may determine whether the motion corresponds to a triggering event in step 302. For example, in step 302, the motion may correspond to the triggering event when an acceleration of mobile device 102 exceeds a predetermined threshold value.

However, the triggering event detected in step 302 is not limited to physical motions. In additional embodiments, the triggering event may represent an action by a user that transitions mobile device 102 from an "active" state to an "inactive" state. Examples of such actions may include, but are not limited to, a positioning of mobile device 102 within a holster, a connection of mobile device 102 to an external power supply, or any additional or alternate action that renders mobile device 102 inactive.

In a further embodiment, the sensor incorporated within mobile device 102 may be an image sensor associated with a digital camera (e.g., a charge coupled device (CCD) or a complementary metal-oxide-semiconductor (CMOS) active pixel sensor). In such an embodiment, the triggering event may correspond to a sudden change in a luminance of incoming light detected by the image sensor, including, but not limited to, a sudden change resulting from the insertion or removal of mobile device 102 from a pocket, holster, or purse.

Further, for example, the triggering event may correspond to a pattern of light detected by an image sensor of mobile device 102, and additionally or alternatively, within a similar image sensor incorporated into stationary device 112. For example, the triggering event may be responsive to the detection of a predetermined pattern of video bits encoded within a vertical blanking interval (VBI) of a television signal by the image sensor of mobile device 102, or alternatively, by the image sensor of stationary device 112.

In additional embodiments, the triggering event detected in step 302 may include, but is not limited to, a period of user inactivity of a predetermined duration, or may be based on a geographic location of mobile device 102 (e.g., as determined by a geo-positioning module associated with mobile device 102). For example, the triggering event may correspond to a movement of mobile device 102 within a specified range of a geographic location, or a movement of mobile device 102 outside of a specified range of a geographic location (e.g., as determined by an absence or presence of a radio signal, such as a Bluetooth signal, a Wi-Fi signal, or a near-field communications (NFC) signal). However, step 302 is not limited to the detection of such exemplary signals, and in additional embodiments, step 302 may detect any additional or alternate triggering event that is apparent to a person of skill in the art, natural to the transfer of application state, and appropriate to mobile device 102.

Once the triggering event is detected in step 302, mobile device 102 may attempt to establish a communication session with stationary device 112 in step 304. Such a communication session may, in an embodiment, represent a peer-to-peer communications session across network 120, or a direct peer-to-peer communications session across connection 130, established in accordance with one or more of the communications protocols outlined above.

For example, the user may have previously paired mobile device 102 and stationary device 112 according to a Bluetooth communications protocol. In such a case, mobile device 102 may establish a connection with stationary device 112 upon detection of a corresponding Bluetooth signal. In such embodiments, the limited geographic range associated with the Bluetooth signal ensures that mobile device 102 is disposed in close proximity to stationary device 112.

If the communications session cannot be established in step 304, mobile device 102 may generate an error message indicative of the failure, and may display the generated error message to a user through an interface (e.g., interface 220) of mobile device 102 in step 306. The exemplary process may pass back to step 302, and mobile device 102 may subsequently await the detection of an additional triggering event.

However, if mobile device 102 establishes the communications session with stationary device 112 in step 304, then mobile device 102 may identify an application for subsequent transfer (i.e., a source application) in step 308. In accordance with one embodiment, one of the application programs executing on mobile device 102 may be selected as the source application in step 308. As discussed above, mobile device 102 may be configured to execute any number of application programs, including, but not limited to instant messaging applications, applications, widgets, or plug-ins associated with social networking and micro-blogging services, word processing applications, spreadsheet applications, media players, computer games, or any additional or alternate applications compatible with mobile device 102.

Further, mobile device 102 may be configured to identify an application with which the user is currently interacting with or last interacted with, and to select that identified application as the source application in step 308. Additionally or alternatively, the user may specify an application to be selected as the source application in step 308 (e.g., as a portion of a device and/or software setup process), or the user may specify a list of applications from which the source application may be selected. However, the selection within step 308 is not limited to such techniques. For example, in additional embodiments, one or more source applications may be selected based on additional or alternate criteria, such as a priority list of applications or set of rules. With a priority list, the state of all active applications on the list may be transferred. As a further example, a set of rules may be applied to control the selection of the source application(s), such as rules that define application(s) that are associated with a triggering event. In certain embodiments, a plurality of triggering events may be defined, each with one or more associated source applications.

Upon selection of the source application, mobile device 102 may generate a representation of a state of the source application in step 310. In an embodiment, the representation of the state of a source application may be a snapshot of the application captured at a particular point in time. For example, such a representation may include, but is not limited to, information specifying a configuration of the source application at the particular point in time, information indicative of the user's interaction with the source application, information currently displayed to the user by the source application, a set of inputs and/or outputs associated with the source application, or any additional or alternate information appropriate to specify the state of the source application on mobile device 102.

Consistent with embodiments of the present disclosure, the representation generated in step 310 may also include, but is not limited to, information that identifies the user of mobile device 102, information that identifies mobile device 102, and information that identifies the source application. For example, the information that identifies the source application may include not only the name of the source application (e.g., Microsoft Word), but also a class of applications to which the source application belongs (e.g., word processing applications). Additionally or alternatively, the information identifying the source application may include a class of data processed by the source application (e.g., tabular data viewable using both word processing and spreadsheet applications). The generated representation may further include information that identifies a directionality of the transfer (e.g., a transfer of state from mobile device 102 to stationary device 112). As discussed below in reference to the exemplary embodiment of FIG. 4, such information may enable stationary device 112 to validate a request from mobile device 102 to transfer the state of the source application.

In an exemplary embodiment, the source application may represent an instant messaging application executed by mobile device 102. In such an embodiment, the representation generated in step 310 may include, but is not limited to, information identifying the user (e.g., a login name, a user name, or an alias), an authentication credential of the user (e.g., a password or answer to a security question), one or more conversations that involve the user, and identifiers of other users participating in active or recent conversations. Further, in additional embodiments, the generated representation may include, but is not limited to, a history of prior conversations that have included the user, a current geographic location of the user, and any additional or alternate information that would enable stationary device 112 to generate an instance of a corresponding instant messaging application that replicates the user's interaction with the source instant messaging application executing on mobile device 102.

Referring again to FIG. 3, the generated representation may be formatted in a manner appropriate to packetized data transfer across network 120. The formatted representation of may subsequently be transmitted to stationary device 112 in step 312, for example, as a request to transfer the state of the source application to stationary device 112. The request may be transmitted from mobile device 102 across network 120 to stationary device 112 using, for example, a peer-to-peer communications protocol such as one of those outlined above. Upon receipt of the request to transfer the state of the application, stationary device 112 may process the representation and transfer the state of the source application to a corresponding target application, as described below in reference to FIG. 4.

Figure 4:
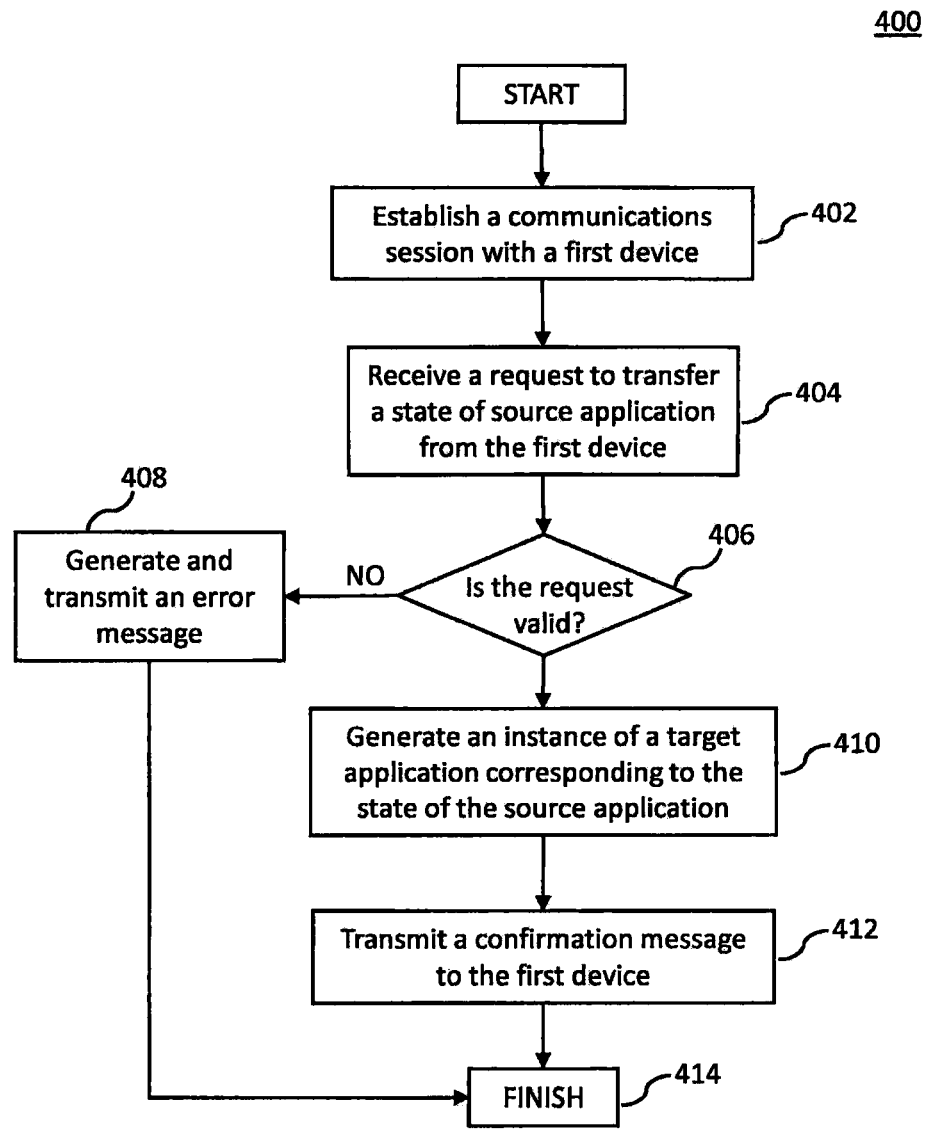

FIG. 4 is a flow diagram of an exemplary method 400 for transferring a state of an application between devices across network 120 in near-real time. Using the exemplary processes of FIG. 4, stationary device 112 may receive a representation of a state of an application from mobile device 102, and generate an instance of a corresponding application that replicates the user's interaction with the application on mobile device 102.

In step 402, stationary device 112 may establish a communications session with mobile device 102. For example, as discussed above, the mobile device 102 and stationary device 112 may establish the peer-to-peer communication session using a Bluetooth communications protocol, a near-field communications protocol, a Wi-Fi communications protocol, or any additional or alternate protocol appropriate for data transfer between the devices.

Once the communications session is established in step 402, stationary device 112 may receive a request from mobile device 102 to transfer a state of a source application executed by mobile device 102. As discussed above, the received request may include a representation of the state of the source application that, for example, represents a snapshot of the source application captured at a particular point in time. The representation may include, but is not limited to, information that specifies a configuration of the source application at the particular point in time, information that identifies a directionality of the requested transfer, information that identifies a user of mobile device 102, information that identifies mobile device 102, information that identifies the source application and a class of applications associated with the source application, and/or information that identifies a class of data associated with the source application (e.g. tabular data associated with a spreadsheet application or a particular type of media).

In step 406, stationary device 112 may process the received representation to validate the requested transfer. For example, in step 406, stationary device 112 may verify an identity of mobile device 102, and/or verify that the header information includes information indicating that mobile device 102 is transferring state to stationary device 112. Additionally, stationary device 112 may determine that the size of the request falls within a predetermined set of limitations, or validate the received request using any additional or alternate criteria.

If stationary device 112 is unable to validate the received request in step 406, then an error message is generated and transmitted to mobile device 102 across communications network 120 in step 408. For example, the transmission of the error message in step 408 may utilize one or more of the exemplary communication protocols outlined above, e.g., the Bluetooth communications protocol.

If stationary device 112 validates the request in step 406, then stationary device 112 may process the received representation to generate an instance of an application (i.e., a target application) in step 410 that replicates the state of the source application received from mobile device 102. For example, mobile device 102 and stationary device 112 may both execute the identical versions of the source application (e.g., a common media player), or alternatively, may execute similar or compatible versions of the source application. Stationary device 112 may determine a target application based on the identifier of the source application (e.g., based on the information identifying the application included within the representation, or alternatively, based on the class of data associated with the source application), and may generate an instance of the target application that replicates the state of the source application received from mobile device 102.

In certain embodiments, stationary device 112 may not execute an application that is identical to or directly compatible with the source application. For example, the user of mobile device 102 may be viewing digital video content using Windows Media Player, and may initiate a transfer of the state of the Windows Media Player to stationary device 112 that executes a QuickTime media player. In such an embodiment, the identifier of the source application included within the received representation may identify Windows Media Player as the source application and may specify that the source application is a media player. In such cases, stationary device 112 may process the received representation to identify a class of applications associated with the source application, and subsequently select a target application that is consistent with that class of applications. For example, stationary device 112 may select its default media player as the target application, or may select any additional or alternate target application consistent with the class of applications to which the source application belongs.

Once the target application is selected, stationary device 112 may update a state of the target application based on the received representation of the state of the source application at step 410. For example, as part of step 410, stationary device 112 may store information indicating the application state and/or generate an instance of the target application having a state consistent with the received representation. As a result, the user's interaction with the instance of the target application at stationary device 112 may represent a seamless extension of the user's interaction with the source application at mobile device 102. Stationary device 112 may subsequently generate an message confirming that the state of the application has been successfully transferred from mobile device 102 to stationary device 112, and the message may be transmitted to mobile device 102 in step 412. As shown in FIG. 4, the exemplary method is completed in step 414.

Referring back to FIG. 3, mobile device 102 may receive a response to the transmitted request from stationary device 112 in step 314. For example, the response received in step 314 may include an error message transmitted from stationary device 112 to indicate an invalid request (e.g., an error message transmitted in step 406 of FIG. 4). Alternatively, the response received in step 314 may include a message transmitted from stationary device 112 to confirm a successful transfer of the state of the source application to the corresponding target application (e.g., a confirmation message transmitted in step 412 of FIG. 4).

The received response may be processed in step 316 to determine whether the state of the source application has been transferred successfully to stationary device 112. If it is determined in step 316 that the transfer has been successful, then mobile device 102 may display a confirmation message to the user of mobile device 102 in step 318 to confirm the successful transfer, and may render the source application inactive in step 320. For example, the confirmation message may include a textual indication of the successful transfer, and additionally or alternatively, may incorporate static or animated graphics indicating to the user that the application has transferred successfully. As shown in FIG. 3, the exemplary method is then completed in step 322.

However, if it is determined in step 316 that the state of the source application has not been successfully transferred to stationary device 112, then mobile device 102 may generate an error message and display the error message to the user of mobile device 102 in step 306. The exemplary process may then pass back to step 302, and mobile device 102 may await an additional triggering event to initiate a subsequent transfer of application state.

In additional embodiments, not shown in FIG. 3, mobile device 102 may also provide the user in step 318 with an opportunity to retransmit the unsuccessful request. If mobile device 102 receives a retransmission request from the user, then the request to transfer the state of the source application may be retransmitted to stationary device 112 in step 312. In such embodiments, mobile device 102 may have an internal counter that limits a number of times the user may retransmit an unsuccessful request to stationary device 112, or alternatively, mobile device 102 may provide the user with an unlimited capability to retransmit failed requests to stationary device 112.

In the embodiments of FIGS. 3 and 4, a user of mobile device 102 may initiate a transfer a state of a source application to stationary device 112, which may automatically validate and finalize the transfer of the state to a corresponding application. As a result, the user may seamlessly transition between applications on the first and second devices without significant interaction.

For example, by shaking a mobile device or tapping the mobile device against a hard surface, a user of the mobile device may transfer the state of an instant messaging application to a desktop computer or other device to which the mobile device has been previously paired. In such an embodiment, the user may seamlessly transition an ongoing instant messaging conversation from the mobile device to the desktop computer.

However, in additional embodiments, the user of the mobile device may desire to transfer the state of the instant messaging application back from the desktop computer to mobile device. For example, the user may be transitioning from home to office, or from office to home, and may wish to continue a conversation with one or more "buddies" on the mobile device during a corresponding commute. In such embodiments, the user may shake, tap, disconnect, or otherwise initiate an action using the mobile device to request a transfer of the state of the instant messaging application back from the desktop device, as described below in FIG. 5.

Figure 5:
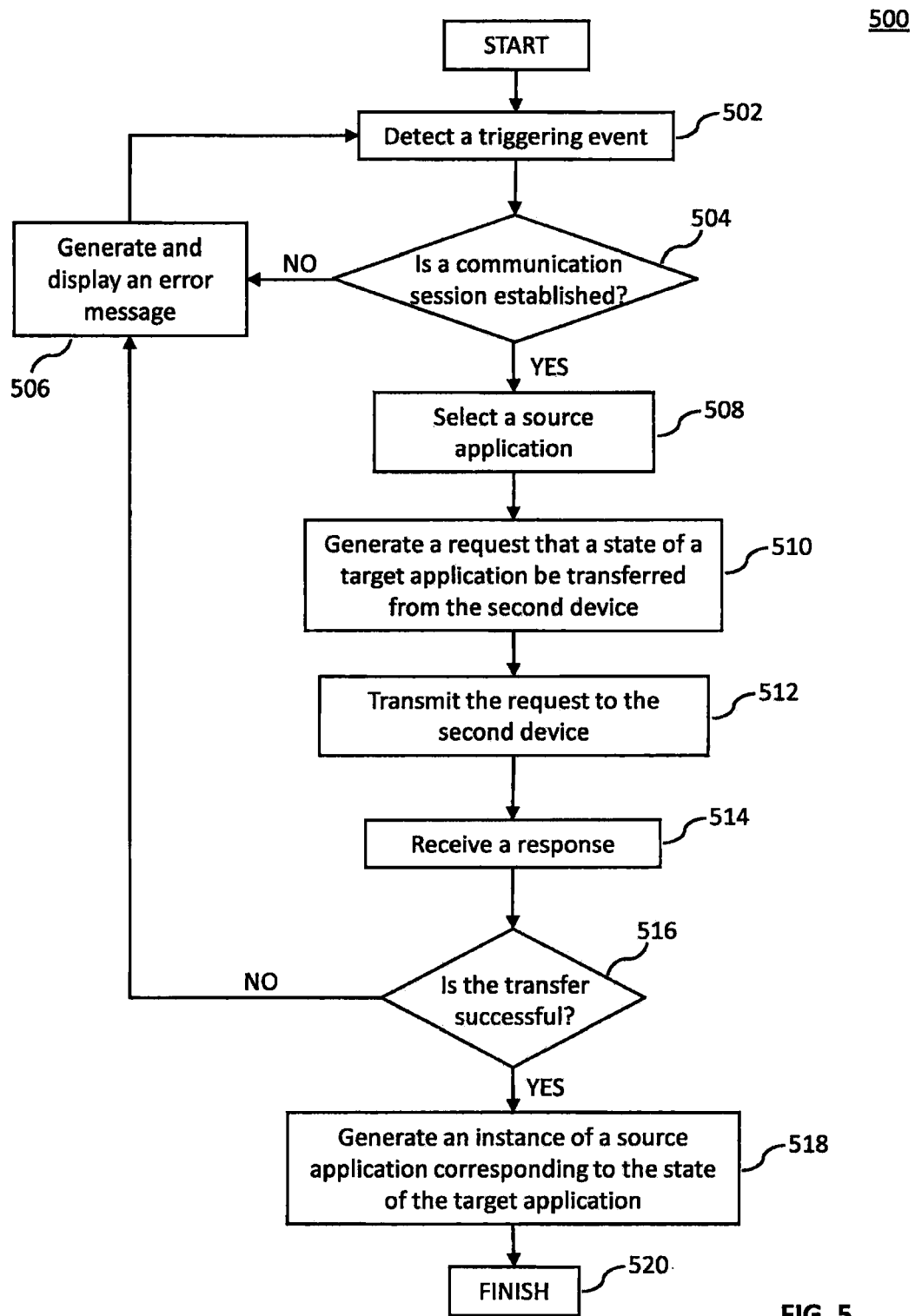
FIGS. 5 and 6 are flowcharts of exemplary methods for transferring a state of an application between devices, according to an embodiment of the present disclosure.

FIG. 5 is a flow diagram of an exemplary method 500 for transferring a state of an application between devices across network 120 in near-real time, according to an embodiment of the present disclosure. Using the exemplary processes of FIG. 5, and in response to a detection of a triggering event, a first device (e.g., mobile device 102 of FIG. 1) may request that a state of an application be transferred from a second device (e.g., stationary device 112 of FIG. 1). Upon successful transfer, the user may seamlessly transition interaction with the application on stationary device 112 to a corresponding application on mobile device 102.

In step 502, mobile device 102 may detect a triggering event that initiates a transfer of a state of an application executing at stationary device 112 back to mobile device 102. For example, the triggering event detected in step 502 may include triggering events similar to those described above in reference to step 302 (e.g., a shaking of mobile device 102 by the user, a gently tapping of mobile device 102 by the user against a solid object, or a removal or disconnecting of mobile device 102 from a holster), or any additional or alternate user-initiated or automated triggering event apparent to a person of skill in the art and appropriate to mobile device 102 (such as pushing a predetermined key or button, or selecting a special icon).

Once the triggering event is detected, mobile device 102 may attempt to establish a communication session with stationary device 112 in step 504. For example, in step 504, mobile device 102 may attempt to establish a peer-to-peer communication session according to one or more of the communications protocols, such as those identified herein. In such embodiments, the limited geographic range associated with a peer-to-peer communications protocol may ensure that mobile device 102 is disposed in close proximity to stationary device 112.

If mobile device 102 is unable to establish a communications session in step 504, then an error message may be generated and displayed to the user in step 506. The exemplary method may pass back to step 502, and mobile device 102 may subsequently await the detection of an additional triggering event.

However, if a communication session is established between mobile device 102 and stationary device 112 in step 504, then mobile device 102 may identify an application (e.g., a source application) in step 508. In accordance with one embodiment, the source application may represent an application whose state was previously transferred to stationary device 112, for example, using the exemplary processes of FIGS. 3 and 4.

Upon identification of the source application, in step 510, mobile device 102 may generate a request that a state of a corresponding application executing on stationary device 112 (i.e., a target application) be transferred to mobile device 102. The generated request may include, but is not limited to, information identifying mobile device 102, information identifying the user of mobile device 102, and/or information identifying the source application designated to receive the transferred state from stationary device 112. Furthermore, the information identifying the source application may include not only a name of the source application (e.g., Microsoft Word, Windows Media Player, AOL IM, etc.), but also a class of applications characteristic of the source application and/or a class of data associated with the source application. Additionally, the generated request may include information that identifies a directionality of the transfer (e.g., a transfer of state from stationary device 112 to mobile device 102). As discussed below with reference to FIG. 6, such information may enable stationary device 112 to validate a request from mobile device 102.

The generated request may be transmitted from mobile device 102 to stationary device 112 in step 512 using one or more of the communications protocols outlined above, e.g., using a Bluetooth connection. Upon receipt of the request, stationary device 112 may validate the request, and upon successful validation, generate and transmit a representation of the state of the source application back to mobile device 102, as described below in reference to FIG. 6.

Figure 6:
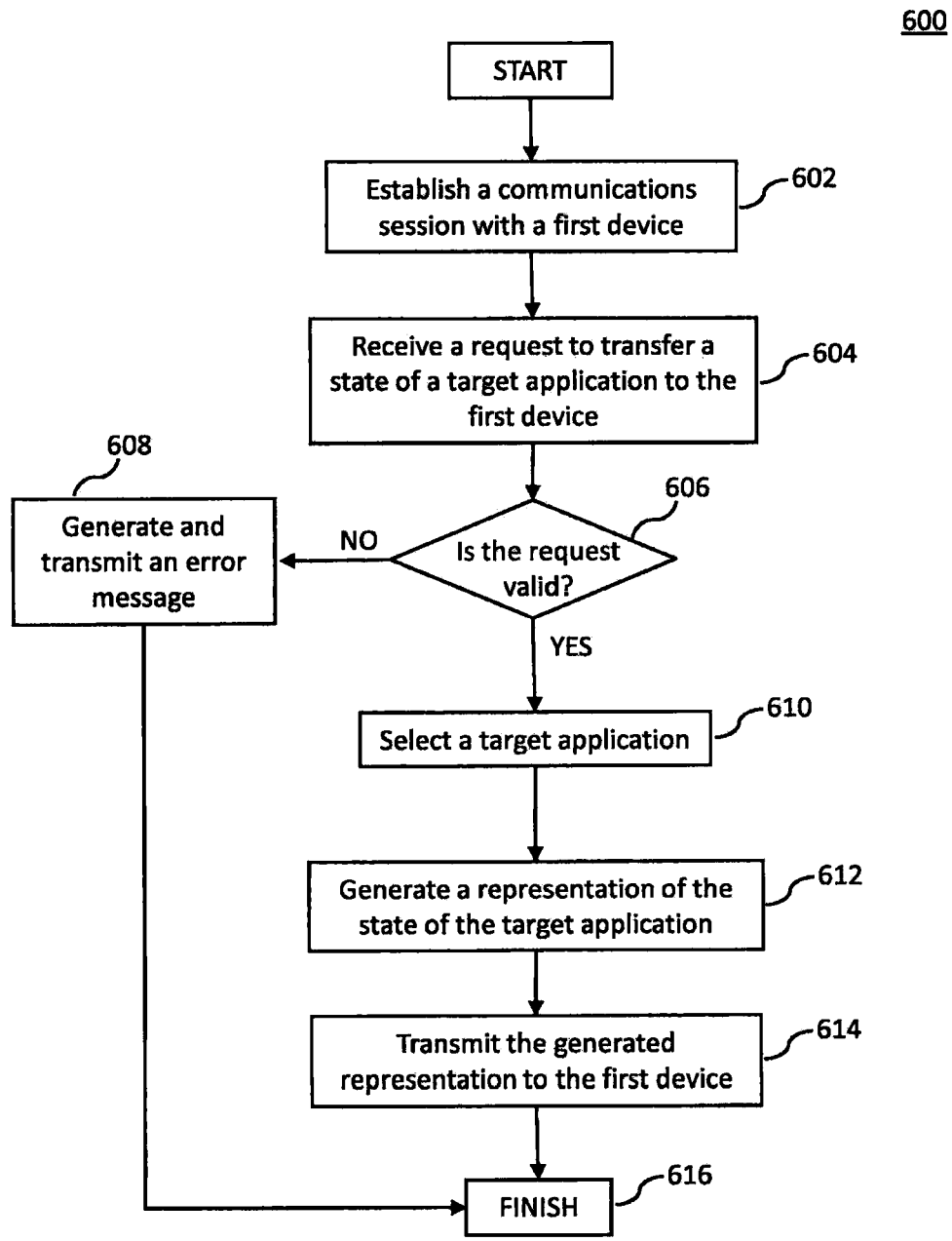

FIG. 6 is a flow diagram of an exemplary method 600 for transferring a state of an application between devices across network 120 in near-real time, according to an embodiment of the present disclosure. Using the exemplary processes of FIG. 6, stationary device 112 may generate and transmit a representation of a state of a target application to mobile device 102 in response to a request received from mobile device 102.

In step 602, a communication session may be established between stationary device 112 and mobile device 102. For example, a peer-to-peer communication session may be established according to a Bluetooth communications protocol, a near-field communications protocol, a Wi-Fi communications protocol, or any additional or alternate protocol apparent to one of skill in the art.

Once the communications session is established, stationary device 112 may receive, from mobile device 102, a request that a state of an application executing on stationary device 112 (i.e. a target application) be transferred to mobile device 102 in step 604. As outlined above, the received request may include, but is not limited to, information identifying mobile device 102, information identifying the user, information identifying an application executing on mobile device 102 (i.e., a source application), information identifying a class of data associated with the source application, and/or any additional or alternate information.

Desktop device 112 may attempt to validate the received request in step 606 based on information included within the received request. For example, the validation in step 606 may be based on an identity of mobile device 102, an identity of the user of mobile device 102, a determination that the received request refers to a transfer from stationary device 112 to mobile device 102, and/or may be based on additional or alternate criteria.

If stationary device 112 is unable to validate the received request in step 606, then an error message is generated and transmitted to mobile device across communications network 120 in step 608. However, if the received request is validated in step 606, then stationary device 112 may select the target application in step 610 based on, for example, the information included within the received request.

For example, and as discussed above, mobile device 102 and stationary device 112 may both execute the identical versions of the source application (e.g., a common media player), or alternatively, may be executing similar or compatible versions of the source application. Stationary device 112 may select the target application in step 610 that corresponds to the identifier of the source application (e.g., based on the information identifying the application included within the request).

In certain embodiments, stationary device 112 may not execute a target application that is identical to or directly compatible with the source application. For example, the user of mobile device 102 may be viewing digital video content using Windows Media Player, and may initiate a transfer of the state of the Windows Media Player to stationary device 112 that executes a QuickTime media player. In such cases, stationary device 112 may process the received request to identify a class of applications or a class of data associated with the source application, and may subsequently select the target application that is consistent with that class of applications or that class of media in step 610.

Once the target application is selected in step 610, stationary device 112 may generate a representation of a state of the target application in step 612. Consistent with embodiments of the present disclosure, the representation of the state of target application may be a snapshot of the target application captured at a particular point in time. For example, such a representation may include, but is not limited to, information specifying the configuration of the target application at a particular point in time, information indicative of the user's interaction with the target application, information currently displayed to the user by the target application, a set of inputs and/or outputs associated with the target application, and/or any additional or alternate information.

In an exemplary embodiment, the target application may represent an instant messaging application executed by stationary device 112. The representation generated in step 612 may include, but is not limited to, information identifying the user (e.g., a login name, a user name, or an alias), an authentication credential of the user (e.g., a password or answer to a security question), one or more conversations that involve the user, and/or identifiers of other users participating in the active or recent conversations. Further, in additional embodiments, the generated representation may include, but is not limited to, a history of prior conversations that have included the user, a current geographic location of the user, and/or any additional or alternate information that would enable mobile device 102 to generate an instance of the source instant messaging application that replicates the user's interaction with the target instant messaging application executing on stationary device 112.

As discussed above, the generated representation may be formatted in a manner appropriate to, for example, packetized data transfer across network 120. Further, the formatted representation of may be transmitted to mobile device 102 in step 614 using, for example, one or more of the peer-to-peer communications protocols. As shown in FIG. 6, the exemplary method is completed in step 616.

Upon receipt of the request to transfer the state of the application, mobile device 102 may process the representation and seamlessly transfer the state of the target application to the corresponding source application.

Referring back to FIG. 5, mobile device 102 may receive a response to the transmitted request from stationary device 112 in step 514. For example, the response received in step 514 may include an error message transmitted from stationary device 112 that is indicative of an invalid request (e.g., an error message transmitted in step 606 of FIG. 6). Alternatively, the response received in step 514 may include a representation of a state of the target application executed by stationary device 112, and may thus indicate a successful transfer of the state of the target application to mobile device 102 (e.g., as generated and transmitted in step 614 of FIG. 6).

The received response may be processed in step 516 to determine whether the state of the target application has been transferred successfully to mobile device 102. If it is determined in step 516 that the state of the target application has not been successfully transferred to mobile device 102, then mobile device 102 may generate an error message and display the error message to the user of mobile device 102 in step 506. The exemplary process may then pass back to step 502, and mobile device 102 may await an additional triggering event to initiate a subsequent transfer of application state.

If it is determined in step 516 that the transfer has been successful, then the response received in step 514 includes the representation of the state of the target application. As discussed above, such a representation may include, but is not limited to, information describing the configuration of the target application at the particular point in time, information indicative of the user interaction with the target application, information currently displayed to the user by the target application, a set of inputs and/or outputs associated with the target application, and/or any additional or alternate information.

In step 518, stationary device 112 may update a state of the source application based on the received representation of the state of the target application. For example, as part of step 518, stationary device 112 may store information indicating the application state and/or generate an instance of the source application that replicates the state of the target application described within the received representation. Using such exemplary processes, the user may seamlessly transition between interaction with the target application on stationary device 112, and a corresponding interaction with the source application executing on mobile device 102. The source application may represent an extension of the user's experience with the target application. The exemplary method of FIG. 5 is completed in step 520.

For example, a user may be participating in an ongoing instant messaging conversation with one or more "buddies" using an instant messaging application that executes on stationary device 112 (e.g., a desktop computer). However, the user may be transitioning from home to office, or from office to home, and may wish to continue a conversation with one or more "buddies" on mobile device 102 during a corresponding commute.

Using the exemplary methods of FIGS. 5 and 6, a user may shake mobile device 102 or tap mobile device 102 against a hard surface to request a transfer of a state of the instant messaging application from stationary device 112 to mobile device 102, and upon successful transfer, the user may continue the ongoing discussion on mobile device 102. As a result, the user may seamlessly transition an ongoing instant messaging conversation from stationary device 112 to mobile device 102.

In the embodiments described above, a user of mobile device 102 (i.e., a first device) initiates a transfer of a state of an application to stationary device 112 (i.e., a second device), or alternatively, the user of mobile device 102 may initiate a transfer of a state of an application from stationary device 112 to mobile device 102. However, the disclosed embodiments are not limited to such scenarios. In additional embodiments, the exemplary methods described above may facilitate a transfer of a state of an application between any combination of devices configured to communicate with one another.

For example, first and second devices consistent with the disclosed embodiments may include, but are not limited to, laptop computer 104 of FIG. 1, VOIP telephone 114 of FIG. 1, any additional mobile device operable within exemplary environment 100 of FIG. 1, and any additional or alternate desktop computer operating within exemplary environment 100 of FIG. 1. Further, exemplary first and second devices consistent with the disclosed embodiments may include, but are not limited to, a mobile telephone, a smart phone, a personal digital assistant having wireless communication capability, a video game controller, a tablet personal computer (PC), a notebook computer, a desktop PC, a display device (e.g., a flat screen television, a LCD television, a plasma television, a projection screen television, or a projection system), a printer or facsimile machine, a set-top box, a digital video recorder (DVR), a web-enabled media player (e.g., a DVD player), a vehicle or personal sound system, and any additional or alternate device operable to transmit and receive data across network 120.

Additionally, although described in terms of an instant messaging application, embodiments of the present disclosure for transferring application state are not limited to such applications. For example, a user may view electronic content through a web browser associated with a first device, and the exemplary processes outlined above may enable the user to transfer a state of the web browser between mobile device 102 and stationary device 112.

In accordance with certain embodiments, a representation of the current state of the browser application may be generated by mobile device 102 (e.g., step 310 of FIG. 3), or alternatively, may be generated by stationary device 112 (e.g., step 612 of FIG. 6). Such a representation may include, but is not limited to, an identifier of the web page or other electronic viewed by the user, including, but not limited to a uniform resource locator (URL), a uniform resource identifier (URI), and/or any additional or alternate protocol for identifying a location of the electronic content. Further, in additional embodiments, the representation of the state may identify a specific portion of the web page or electronic content viewed by the user (e.g., a location of the viewing window within the web page). Additionally or alternatively, such a representation may also incorporate authentication information associated with the user, or any other information apparent to one of skill in the art that would enable the user to access the web page or electronic content at stationary device 112 or at mobile device 102.

Further, by way of example, a user may execute a media player that enables the user to view a particular portion of electronic content (e.g., streaming digital audio or video content), and the exemplary processes described above may enable the user to transfer a current state of the media player between devices. To effect such a transfer, mobile device 102 may generate a representation of the current state of the media player (e.g., in step 310 of FIG. 3), or alternatively, stationary device 112 may generate a corresponding representation of the current state of the media player (e.g., in step 612 of FIG. 6).

Consistent with certain embodiments, the representations of the state of the application may identify the displayed electronic content and include a location of that content to enable access (e.g., a uniform resource locator (URL), a uniform resource identifier (URI), and/or any additional or alternate protocol for identifying a location of the electronic content. Further, by way of example, the representation may identify a temporal position within the electronic content that corresponds to the particular time associated with the state, and additionally or alternatively, system parameters associated with the playback of the electronic media, such as a volume of the playback and a width-to-height aspect ratio of the playback.

Further, in additional embodiments, the disclosed systems and methods are not limited to transferring state of an application executed by user of a first device or a second device. For example, the user of a mobile phone (e.g., mobile device 102 of FIG. 1) may be conducting a telephone conversation with a party, and may wish to transfer that telephone call to a IP-enabled telephone (e.g., VOIP phone 114 of FIG. 1) or any additional mobile telephone using the exemplary processes outlined above.

For example, by shaking mobile device 102 or tapping mobile device 102, a user of mobile device 102 may initiate a transfer of an ongoing telephone call to VOIP phone 114. In such embodiments, mobile device 102 may generate a representation of the ongoing telephone call for transfer to VOIP phone 114. Such a generated representation may include, but is not limited to, information identifying the user and mobile device 102, information identifying a called party, and/or information identifying a connection pathway through which VOIP phone 114 may regenerate an instance of the ongoing telephone call.

In a similar fashion, and as described above in reference to FIGS. 5 and 6, the user of mobile device 102 may shake or tap mobile device 102 to initiate a transfer of an ongoing telephone call from VOIP phone 114, or any additional or alternate mobile device, to mobile device 102. In such an embodiment, VOIP phone 114 may generate a representation of the current state of the call, which may include, but is not limited to, information identifying the user and VOIP phone 114, information identifying a called party, and information identifying a connection pathway through which VOIP phone 114 may transmit information associated with the ongoing telephone call to mobile device 102, which may regenerate an instance of the ongoing telephone call.

However, the disclosed embodiments are not limited to transfers of ongoing telephone calls. For example, a user of a mobile device 102, may execute an application that plays back media content designated by the user, for example, within a playlist. Using the disclosed embodiments, the user of mobile device 102 may shake or tap mobile device 102 in order to initiate a transfer of the ongoing playback to an additional device, e.g., a vehicle or home sound system. In such embodiments, mobile device 102 may generate a representation of the current state of the playback that may include, but is not limited to, information identifying the user and mobile device 102, information identifying a location of the playlist (e.g., a URL, URI, or other suitable locator), and a current temporal position of the user within the playlist.

In additional embodiments, the exemplary systems and methods described above may enable a user to transfer a state of any of a number of applications between any combination of devices operable within environment 100. For example, and without limitation, such applications may include instant messaging applications, widgets, or plug-ins associated with social networking and micro-blogging services (e.g., Facebook or Twitter), word processing applications, spreadsheet applications, media players, computer games, and any additional or alternate application compatible with the devices.

The exemplary systems and methods described above enable a user to transfer a state of an application between any combination of devices operable within environment 100. However, the disclosed embodiments are not limited to the transfer of a single application between devices, and in additional embodiments, the exemplary systems and methods described above may enable the user to translate a plurality of active applications between devices operation within computing environment 100. For example, using the disclosed embodiments, a user of mobile device 102 may transfer of a state an active instant messaging application, a state of an active web browser, a state of an active media player, or a state of any additional or alternate active application to stationary device 112, or any additional or alternate device operable in computing environment 100.

Various embodiments have been described herein with reference to the accompanying drawings. It will, however, be evident that various modifications and changes may be made thereto, and additional embodiments may be implemented, without departing from the scope of the present disclosure as set forth in the claims that follow.

Further, other embodiments will be apparent to those skilled in the art from consideration of the specification and practice of one or more embodiments disclosed herein. It is intended, therefore, that this disclosure and the examples herein be considered as exemplary only, with a true scope and spirit of the invention being indicated by the following listing of exemplary claims.

What is claimed is:

1. A computer-implemented method for transferring the configurational state of an application, comprising:

detecting, using a sensor associated with a first device, a gestural input by a user of the first device, the gestural input being detected at a first point in time;

based on the gestural input, identifying a source application with which the user of the first device interacts at the first point in time, the source application being associated with a class of data and comprising a first web browser executed by the first device to present, to the user through a first interface, a first viewing window portion of a web page at the first point in time, the source application being one of a plurality of applications executed at the first device;

generating a representation of a state of the source application, wherein the representation includes information specifying a configurational state of the source application and information indicative of the gestural input associated with the source application;

determining data indicative of a position of the first viewing window portion within the web page;

detecting a gestural input by the user at a second device and wherein the gestural input transitions the second device to an active state;

receiving, at the first device, a request to validate a transfer of the representation of the state of the source application to the second device;

validating the transfer of the representation of the state of the source application by verifying header information received from the second device and determining that a data size of the request is within a predetermined range;

transmitting to the second device, the generated representation of the state of the source application, information identifying a user of the first device, the first web browser, and the first viewing window portion, wherein the information identifying the first viewing window portion comprises an identifier of the web page, a location of the web page, and determined position data, the determined position data being indicative of a

19 position of the first viewing window portion within the web page at the first point in time; and receiving a visual notification corresponding to whether the transmission of the generated representation of the state of the source application to the second device was successful;

wherein the generated representation of the state of the source application transmitted with the information identifying the user of the first device, the first web browser, authentication credentials corresponding to the first user, and the first viewing window portion causes the second device to execute a second web browser that presents at least the first viewing window portion of the web page to the user through a second viewing window.

2. The computer-implemented method of claim 1, wherein:

the method further comprises establishing a peer-to-peer communications session between the first and second devices; and wherein transmitting comprises transmitting the information identifying a user of the first device, the first web browser, and the first viewing window portion, being transmitted directly from the first device to the second device, using the peer-to-peer communications session.

3. The computer-implemented method of claim 1, further comprising:

detecting a motion of the first device;

determining that an acceleration associated with the detected motion exceeds a threshold value; and when the determined acceleration exceeds the threshold value, identifying the source application executed by the first device.

4. The computer-implemented method of claim 1, further comprising:

wherein the representation further comprises at least one of information identifying the first device or information identifying the class of data associated with the source application.

5. The computer-implemented method of claim 1, further comprising:

deactivating the source application at the first device and terminating the peer-to-peer communications session, in response to receiving a notification that the transmission was successful.

6. The computer-implemented method of claim 5, further comprising:

generating an instruction to display, at the first device, an indication of the successful transfer.

7. The computer-implemented method of claim 1, further comprising:

transmitting, to the second device, a request that a state of a target application being associated with a class of data and comprising a second web browser and executing at the second device be transferred to the first device;

receiving, in response to the request, information identifying the target application and information associated with a portion of electronic content presented to the user by the target application through a second interface at a second point in time, the second point in time being associated with the request, and the information including the identifier of the class of data associated with a source application comprising a second web browser and identifier of the class of application associated with the source application, data specifying the

20 location of the electronic content, and data indicative of a temporal position of the presented portion within the electronic content; and executing, using the at least one processor, an instance of an application that corresponds to the target application state based on at least the information identifying the target application and information associated with a portion of electronic content presented to the user by the target application through a second interface at a second point in time.

8. The computer-implemented method of claim 7, wherein the target application is associated with a class of applications that includes the source application.

9. The computer-implemented method of claim 7, further comprising:

receiving information associated with a configuration of the target application at a particular point in time; and executing the instance of the target application based at least one of information identifying the first device, information identifying the target application, the identifier of the class of data associated with the source application, data specifying the location of the electronic content, and data indicative of a position of the presented portion within the electronic content.

10. The computer-implemented method of claim 9, further comprising:

receiving an confirmation from the second device that the request for transfer is unsuccessful; and generating an instruction to display, at the first device, an indication of an unsuccessful transfer.

11. An apparatus for transferring the configurational state of a application, comprising:

a storage device; and at least one processor coupled to the storage device, wherein the storage device stores a set of instructions that are executable by the at least one processor to configure the at least one processor to:

detect, using a sensor associated with a first device, a gestural input by a user of the first device, the gestural input being detected at a first point in time;

based on the gestural input, identify a source application with which the user of the first device interacts at the first point in time, the source application being associated with a class of applications and comprising a first web browser executed by the first device to present, to the user through a first interface, a first viewing window portion of a web page at the first point in time, the source application being one of a plurality of applications executed at the first device;

generate a representation of a state of the source application, wherein the representation includes information specifying a configurational state of the source application and information indicative of the gestural input associated with the source application;

determine data indicative of a position of the first viewing window portion within the web page;

detect a gestural input by the user at a second device and wherein the gestural input transitions the second device to an active state;

receive, at the first device, a request to validate a transfer of the representation of the state of the source application to the second device;

validate the transfer of the representation of the state of the source application by verifying header information received from the second device and determine that a data size of the request is within a predetermined;

transmit to the second device, the generated representation of the state of the source application, information identifying a user of the first device, the first web browser, the first viewing window portion, an identifier of the web page, a location of the web page, and determined position data, the determined position data being indicative of a position of the first viewing window portion within the web page at the first point in time; and receive a visual notification corresponding to whether the transmission of the representation of the state of the source application to the second device was successful;

wherein the generated representation of the state of the source application, transmitted with the information identifying the user of the first device, the first web browser, the first viewing window portion, authentication credentials corresponding to the first user, and the identifier of the web page causes the second device to execute a second web browser that presents at least the first viewing window portion of the web page to the user through a second viewing window.

12. The apparatus of claim 11, wherein the at least one processor is further configured by the set of instructions to:

transmit, to the second device, a request that a state of a target application comprising a second web browser executing at the second device be transferred to the first device;

receive, in response to the request information identifying the target application comprising a second web browser and information associated with a second portion of electronic content presented to the user by the target application comprising a second web browser through a second interface at a second point in time, the second point in time being associated with the request, and the information comprising the identifier of the electronic content, data specifying the location of the electronic content, and data indicative of a temporal position of the presented second portion within the electronic content; and execute an instance of an application that corresponds to a state of the target application comprising a second web browser based on at least the information identifying the target application comprising a second web browser and information associated with a second portion of electronic content presented to the user by the target application comprising a second web browser through a second interface at a second point in time, the second point in time being associated with the request, and the information comprising the identifier of the electronic content.

13. A tangible, non-transitory computer-readable medium storing a set of instructions for transferring the configurational state of a application that, when executed by at least one processor, causes the at least one processor to perform a method comprising the steps of:

detecting, using a sensor associated with a first device, a gestural input by a user of the first device, the gestural input being detected at a first point in time;

based on the gestural input, identifying a source application with which the user of the first device interacts at the first point in time, the source application being associated with a class of applications and comprising a first web browser executed by the first device to present, to the user through a first interface, a first viewing window portion of a web page at the first point in time, the source application being one of a plurality of applications executed at the first device;

generating a representation of a state of the source application, wherein the representation includes information specifying a configurational state of the source application and information indicative of the gestural input associated with the source application;

determining data indicative of a position of the first viewing window portion within the web page;

detecting a gestural input by the user at a second device and wherein the gestural input transitions the second device to an active state;

receiving, at the first device, a request to validate a transfer of the representation of the state of the source application to the second device;

validating the transfer of the representation of the state of the source application by verifying header information received from the second device and determining that a data size of the request is within a predetermined range;

transmitting to the second device, the generated representation of the state of the source application, information identifying a user of the first device, the first web browser, the first viewing window portion, an identifier of the web page, a location of the web page, and determined position data, the determined position data being indicative of a position of the first viewing window portion within the web page at the first point in time; and receiving a visual notification corresponding to whether the transmission of the generated representation of the state of the source application to the second device was successful;

wherein the generated representation of the state of the source application transmitted with the information identifying the user of the first device, the first web browser, the first viewing window portion, the identifier of the web page, authentication credentials corresponding to the first user, and the location of the web page causes the second device to execute a second web browser that presents at least the first viewing window portion of the web page to the user through a second viewing window.

14. The computer-readable medium of claim 13, wherein the method further comprises the steps of:

transmitting, to the second device, a request that a state of a target application comprising a second web browser executing at the second device be transferred to the first device;

receiving, in response to the request, information identifying the target application and information associated with a portion of the electronic content presented to the user by the target application through a second interface at a second point in time, the second point in time being associated with the request, and the information comprising the identifier of the electronic content, data specifying the location of the electronic content, and data indicative of a temporal position of the presented portion within the electronic content; and executing, using the at least one processor, an instance of an application that corresponds to the target application state based on at least the information identifying the target application and information associated with a portion of the electronic content presented to the user by the target application through a second interface at a second point in time.

15. A computer-implemented method for transferring the configurational state of an application, comprising the following operations performed by at least processor:

receiving, from a first device, a request to transfer a state of a source application executed by the first device to a second device, wherein:

the request is responsive to a gestural input by a user of the first device detected at a first point in time by a sensor associated with the first device;

the request identifies the source application based on the gestural input, the source application comprising a first web browser executed by the first device to present, to the user through a first interface, a first viewing window portion of a web page at the first point in time associated with the detection of the gestural input, the source application being one of a plurality of applications executed at the first device;

the request generates a representation of a state of the source application, wherein the representation includes information specifying a configurational state of the source application and information indicative of the gestural input associated with the source application; and the request comprises information identifying a user of the first device, the first web browser, the first viewing window portion of the web page, an identifier of the web page, data specifying a location of the web page, and position data indicative of a position of the first viewing window portion within the web page, the position data being indicative of a position of at least a portion of the first viewing window portion within the first web page at the first point in time;

determining that the received request is valid by verifying header information received from the second device and determining that a data size of the request is within a predetermined range;

executing, in response to the determination that the received request is valid, an instance of a target application at a second device that corresponds to the generated representation of the state of the source application, and the information identifying the user of the first device, the first web browser, and the first viewing window portion of the web page, the target application comprising a second web browser that presents at least the first viewing window portion of the web page to the user through a second viewing window executed by the second device; and transmitting information associated with the second web browser to the first device.

16. The computer-implemented method of claim 15, wherein the information associated with the target application instance comprises information associated with the target application at the particular point in time.

17. The computer-implemented method of claim 15, wherein the determining comprises determining that the received request is valid based on at least information identifying a direction of the requested transfer.

18. The computer-implemented method of claim 15, wherein the information associated with the target application instance is transmitted using a peer-to-peer communications session established between the first device and the second device.

19. The computer-implemented method of claim 15, wherein the source application is associated with a class of applications that includes the web-based target application.

20. The computer-implemented method of claim 15, further comprising:

generating a confirmation of a successful transfer of the source application state; and transmitting the confirmation to the first device.

21. The computer-implemented method of claim 1, further comprising transmitting information identifying a class of applications associated with the identified source application.

22. The computer-implemented method of claim 15, wherein:

the request further comprises information identifying a class of applications that includes the source application and at least one alternate application; and the method further comprises:

determining whether the second device is capable of executing the source application; and when the second device is incapable of executing the source application establishing the alternate application as the target application.

23. The computer-implemented method of claim 7, wherein executing the instance comprises:

obtaining the electronic content from the specified location based on the identifier; and generating an electronic command to present at least a second portion of the electronic content to the user through a corresponding second interface, the presented second portion being disposed at the specified position within the electronic content.

24. The computer-implemented method of claim 7, wherein:

the electronic content further comprises streaming video content;

the position data further indicates a temporal position of the presented first portion within the streaming video content.

25. The computer-implemented method of claim 15, wherein executing the instance comprises:

obtaining content associated with the web page from the specified location based on the identifier; and generating an electronic command to present at least a second portion of the web page to the user through a corresponding second interface, the presented second portion being disposed at the specified position within the web page.

* * * * *